US007012762B2

(12) United States Patent
Tseng et al.

(10) Patent No.: US 7,012,762 B2
(45) Date of Patent: Mar. 14, 2006

(54) MICRO OPTICAL PICKUP HEAD MODULE, METHOD OF MANUFACTURING THE SAME AND METHOD OF MANUFACTURING THE OBJECTIVE LENS OF THE SAME

(75) Inventors: Fan-Gang Tseng, Hsinchu (TW);
Kuo-Yung Hung, Hsinchu (TW);
Heng-Tsang Hu, Kaoshiung (TW)

(73) Assignee: National Tsing Hua University, Hsinchu (TW)

( * ) Notice: Subject to any disclaimer, the term of this patent is extended or adjusted under 35 U.S.C. 154(b) by 29 days.

(21) Appl. No.: 10/847,245

(22) Filed: May 17, 2004

(65) Prior Publication Data

US 2004/0257674 A1    Dec. 23, 2004

(30) Foreign Application Priority Data

May 21, 2003    (TW)    ................................ 92113762 A

(51) Int. Cl.
*G02B 3/02*    (2006.01)
*G02B 17/00*   (2006.01)

(52) U.S. Cl. .................. 359/726; 359/718; 359/719; 369/44.23; 369/44.12

(58) Field of Classification Search ................ 359/726, 359/718, 719, 724, 730, 737, 619, 621, 623, 359/627, 629; 369/44.23, 44.12
See application file for complete search history.

(56) References Cited

U.S. PATENT DOCUMENTS 5,317,551 A * 5/1994 Shiono ..................... 369/44.12
5,787,058 A * 7/1998 Choi ........................ 369/44.23

* cited by examiner

*Primary Examiner*—Timothy Thompson
(74) *Attorney, Agent, or Firm*—Egbert Law Offices

(57) ABSTRACT

At least two Fresnel lenses are formed on a transparent substrate, and a set of parallel plates are established in an acute included angle (from 19° to 90°) with the transparent substrate by an inclined exposure process employing a thick film photoresist. The parallel plates are separately placed over the Fresnel lenses. Metal layers are separately deposited on the outside surfaces of the parallel plates far from the acute included angle. A transparent polymeric material is overlaid on the surface of the transparent substrate till the parallel plates are immersed. An objective lens, placed over a photo detector, is formed on the surface of the transparent polymeric material. A laser diode is placed at a location on the surface of the substrate opposite to one of the Fresnel lenses, and the photo detector is placed at a location on the surface of that opposite to another of the Fresnel lenses.

17 Claims, 8 Drawing Sheets

1

MICRO OPTICAL PICKUP HEAD MODULE, METHOD OF MANUFACTURING THE SAME AND METHOD OF MANUFACTURING THE OBJECTIVE LENS OF THE SAME

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a micro optical pickup head module, method of manufacturing the same and method of manufacturing the objective lens of the same, and more particularly, to an optical pickup head module capable of reading and writing data from an optical storage medium.

BACKGROUND OF THE INVENTION

An optical pickup head module is the key of components in an optical disk drive, and emits a laser beam for reading and writing data from an optical disk. For fast, continuously reading of the data, the optical disk drive needs to drive the optical disk in a high-speed rotation. Meanwhile, the optical pickup head module retrieves the signals of the data by following the rotation of the optical disk.

A conventional optical pickup head module has a pickup head, photo detectors and a miniature optical lens, which are all fabricated on a frame; therefore, the setting angle of each of them and the relative positions between each other require much accuracy. FIG. 1 is a schematic diagram of a conventional optical pickup head module. The ray emitted from a first laser diode 141 or a second laser diode 142 passes through a collimation lens 11 to form a collimated light beam, and the collimated light beam is reflected to a beam splitter 13 by a mirror 12. Parts of the collimated light beam are redirected to an optical disk 95 and focused on its recorded tracks (not shown). Various optical signals in response to the pits on the recorded tracks are split into two parts, and one of the parts is focused on a photo detector 15. Generally, the first laser diode 141 emits an expanding laser beam in a wavelength 780 nm for reading data from an optical disk with CD format, whereas the second laser diode 142 emits an expanding laser beam in a wavelength 650 nm for reading data from an optical disk with DVD format.

Conventional pickup head module not only has numerous elements and a complicated assembling process, but also needs a lot of space for light to have a complete travel path. In conclusion, the market of optical disk drives stands in need of an integrated and low-cost process to solve the aforesaid problems of the optical pickup head.

BRIEF SUMMARY OF THE INVENTION

The first objective of the present invention is to provide a micro optical pickup head module and method of manufacturing the same, which integrates mirrors with adjustable inclined angles, objective lenses, laser diodes and photo detectors on a transparent substrate by a micro electromechanical process. Therefore, the complexity of assembly for the module is truly decreased and the accuracy of position alignment for each of elements is also satisfied.

The second objective of the present invention is to provide a low-cost optical pickup head module whose optical mirrors are fabricated by a semiconductor process; hence a plurality of the modules can be formed on a transparent substrate simultaneously.

The third objective of the present invention is to provide a miniature optical pickup head module. Because all the elements are integrated on a transparent substrate, the entire volume of the module is minimized.

In order to achieve these objectives, the present invention discloses a micro optical pickup head module, method of manufacturing the same and method of manufacturing the objective lens of the same. At least two Fresnel lenses are formed on a transparent substrate, and a set of parallel plates are established in an included angle (from 19° to 90°) with the transparent substrate by an inclined exposure step employing a thick film photoresist. The parallel plates are separately placed over the Fresnel lenses. Metal layers are separately deposited on the outside surfaces of the parallel plates far from the acute included angle, wherein one of the metal layers makes the parallel plates as mirrors to reflect rays, and the other makes the parallel plates as beam splitters to simultaneously reflect and refract rays. A transparent polymeric material is overlaid on the surface of the transparent substrate till the parallel plates are immersed. Then, an objective lens, placed over a photo detector, is formed on the surface of the transparent polymeric material. Final, a laser diode is placed at a location on the surface of the substrate against one of the Fresnel lenses, and the photo detector is placed at a location on the surface of that against another of the Fresnel lenses.

The objective lens is a plano-convex lens fabricated by a 3D shadow mask, or is formed on the transparent polymeric material from a photoresist due to its surface tension effect of cohesion adjusted by temperature and the characteristic of hydrophilicity and hydrophobicity.

BRIEF DESCRIPTION OF THE SEVERAL VIEWS OF THE DRAWINGS

The invention will be described referring to the appended drawings.

DETAILED DESCRIPTION OF THE INVENTION

FIGS. 2(a)–2(e) are schematic diagrams of the manufacturing process for a micro optical pickup head module in accordance with the present invention diversion. First, Fresnel lenses 22, acting as collimation and focusing lenses, are formed on the transparent substrate 21. Referring to Fresnel lenses 22, after washing the transparent substrate 21 with sulphuric acid and hydrogen peroxide, they are fabricated through spinning a thin film photoresist on the transparent substrate 21 and then exposing and developing the thin film photoresist to be their complementation patterns. For the sake of low cost and excellent optical characteristics, the transparent substrate 21 is usually made from glass. Then, an aluminum layer with the thickness of 1500 Å, as the diffraction fringe of the Fresnel lenses 22, is deposited on the transparent substrate 21, and with that the whole transparent substrate 21 is immersed in a solution including a photoresist stripper. Final, the Fresnel lenses 22 remain on the transparent substrate 21 by a lift-off step.

Figure 1:
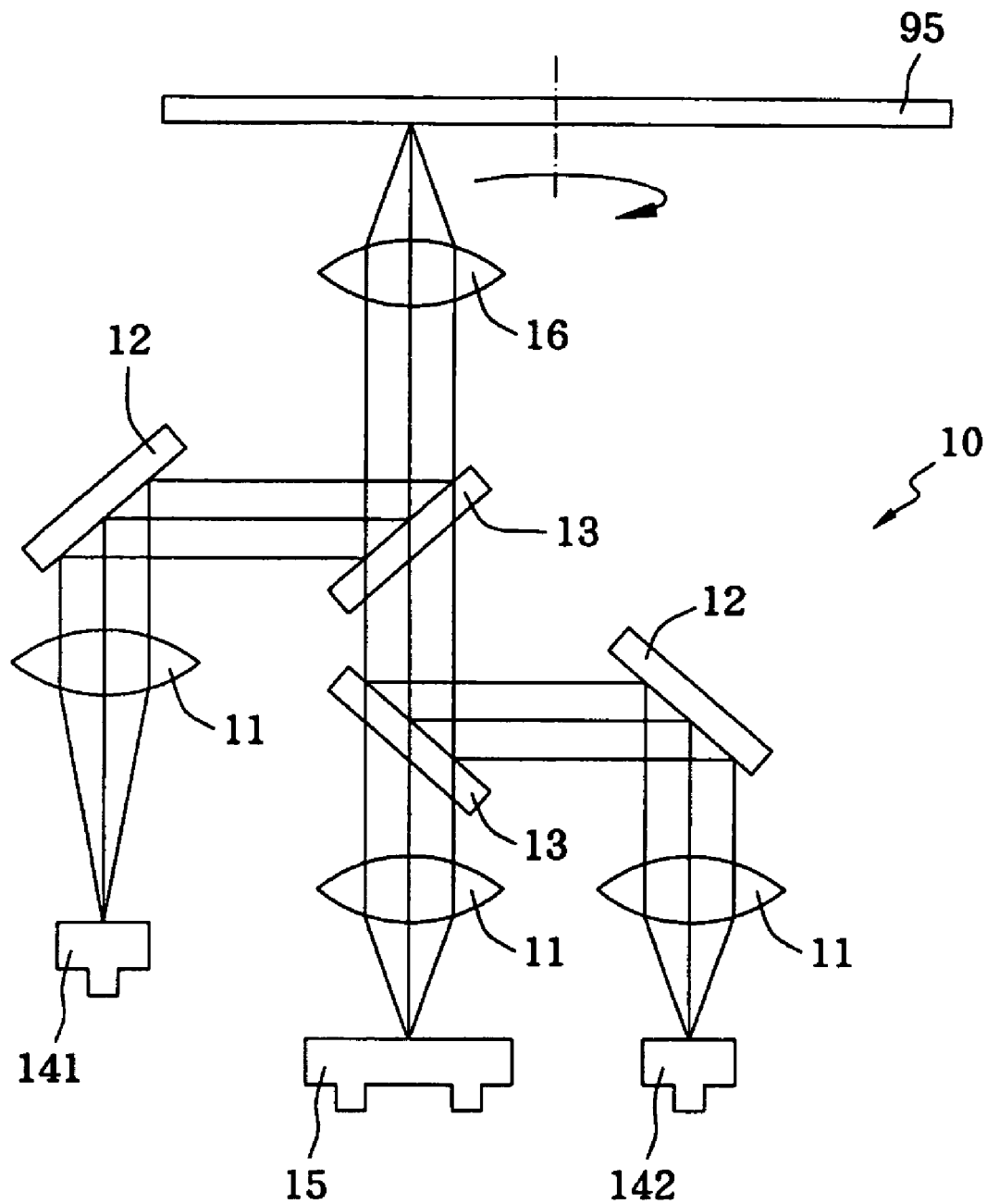
FIG. 1 is a schematic diagram of a conventional optical pickup head module.
Figure 2A:
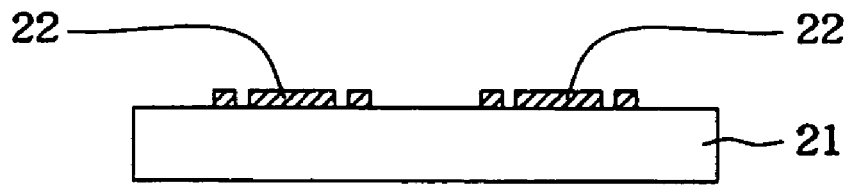
FIGS. 2(a)–2(e) are schematic diagrams of the manufacturing process for a micro optical pickup head module in accordance with the present invention.
Figure 2B:
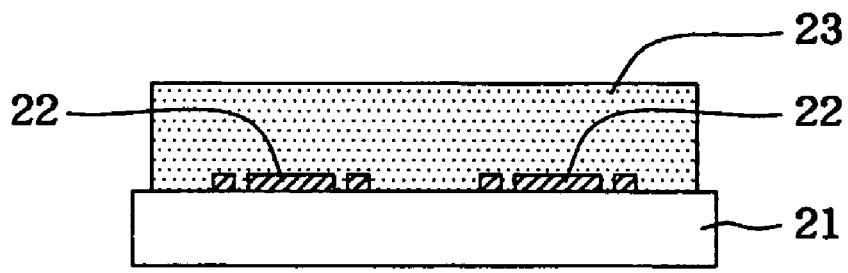

FIG. 2(b) shows that a thick film photoresist layer 23 is coated on the surface of the Fresnel lenses 22 by a spin step. A photoresist with a model No. SU-8 is a superior selection for the thick film photoresist layer 23. In order to reduce the power loss of a laser beam, it is preferred to have the thick film photoresist layer 23 with the thickness of 1,000 μm. The thick film photoresist layer 23 needs to be cured by baking. However, the upper surface of it is uneven due to the lack of uniform heat and a horizontal after being cured. A glycerol film can be coated on the upper surface of the thick film photoresist layer 23 by spinning; in consequence, the uneven portions and pinholes of that are leveled up and filled so as to reduce the optical refraction effect from these defects. The glycerol is a transparent material whose viscosity and refractive index (around 1.6) are very close to the viscosity and refractive index of the thick film photoresist layer 23 with model No. SU-8, and further cannot react upon the thick film photoresist layer 23 chemically. It is a superior material for filling the pinholes. Of course, other transparent liquid can also substitute glycerol to achieve the same result, but the refractive index of the liquid is preferred in the range of 1.4–1.8.

Figure 2C:
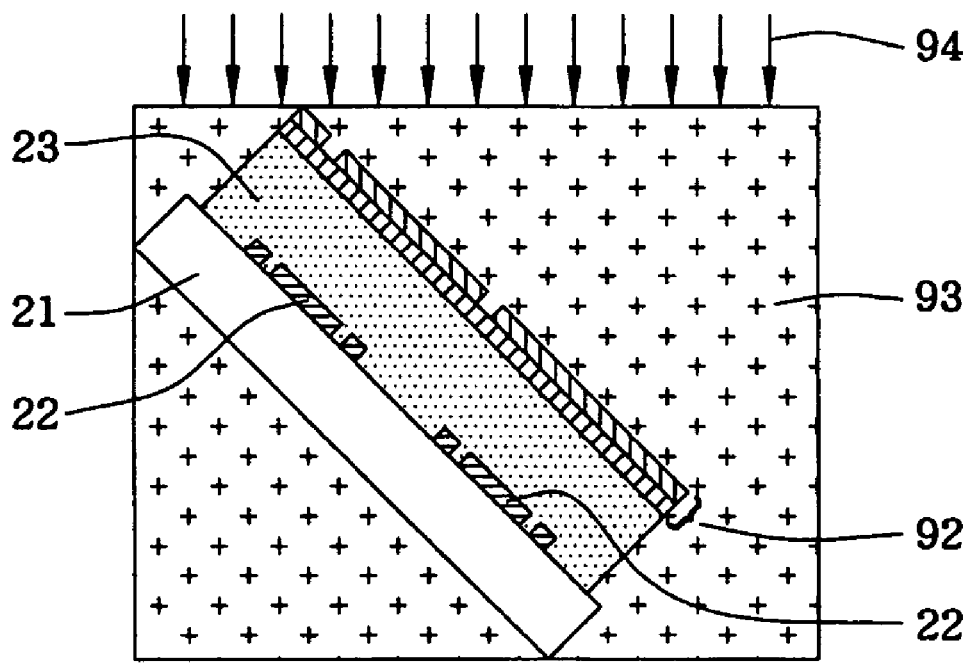

Then, we combine a mask 92 with the transparent substrate 21, the thick film photoresist layer 23, and place the combination under exposure light source, as shown in FIG. 2(c). A certain included angle exists between the upper surface of the combination and the incidence direction of the exposure light 94. This step is called an inclined exposure step different from those vertical exposure steps. Because the refractive index of air around 1 is less than the refractive index of the glass mask 92 around 1.53, the refraction angle is far smaller than the incidence angle. The incidence angle is referred to the included angle between the proceeding direction of the exposure light 94 and the normal line perpendicular to the surface of the mask 92. When the exposure light 94 arrives and passes through the surface of the mask 92, its proceeding direction changes into different direction. The refraction angle is referred to the included angle between the changed direction and the normal line perpendicular to the surface of the mask 92. In comparison with the refraction index of the air, the refraction index of the thick film photoresist layer 23 is 1.67, hence the secondary refraction angle and the secondary incidence angle of the exposure light 94 is approximately identical. If we hope to have exposure in a larger inclined angle to the thick film photoresist layer 23 and free from the limitation of the primary refraction angle, the combination can be immersed in the glycerol 93. In consequence, the refraction angle and the incidence angle of the exposure light 94 regarding the mask 92 are approximately identical.

Figure 2D:
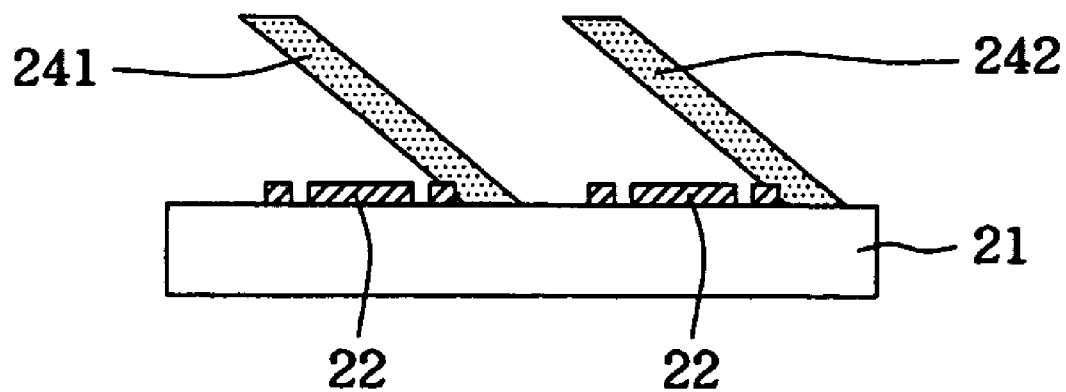

If the selected thick film photoresist layer 23 is a negative photoresist, the unexposed portion of it covered by the mask 92 is removed during a succeeding photoresist striping step. Therefore, the set of a inclined first mirror 241 and a inclined second mirror 242 remain on the transparent substrate 21, and the included angle between the set and the transparent substrate 21 is adjustable from 19 degrees to 90 degrees, as shown in FIG. 2(d). The first inclined mirror 241 and inclined second mirror 242 separately overlap above the Fresnel lenses 22, and the outside surfaces of them far from the acute included angles are separately deposited with the first metal layer 251 and second metal layer 252. The first metal layer 251 makes the first mirror 241 as a beam splitter to simultaneously reflect and refract rays, and the second metal layer 252 makes the second mirror 242 as a reflector to completely reflect rays.

The surface of the transparent substrate 21 is coated with an anti-reflecting layer, e.g., a photoresist with a model No. CK6020L, to prevent the exposure light 94 from being symmetrically reflected by the surface of the transparent substrate 21. The anti-reflecting layer, or commonly called a black photoresist, can absorb any light reflected from the surface of the transparent substrate 21 when the inclined exposure step is executed. In addition, a polarized mirror also can eliminate parts of the reflected light. If the polarized mirror is placed in front of the path of the exposure light 94, the parts of light with the direction of specific amplitude are removed and the residues of light is hard to be reflected by the surface of the transparent substrate 21.

Figure 2E:
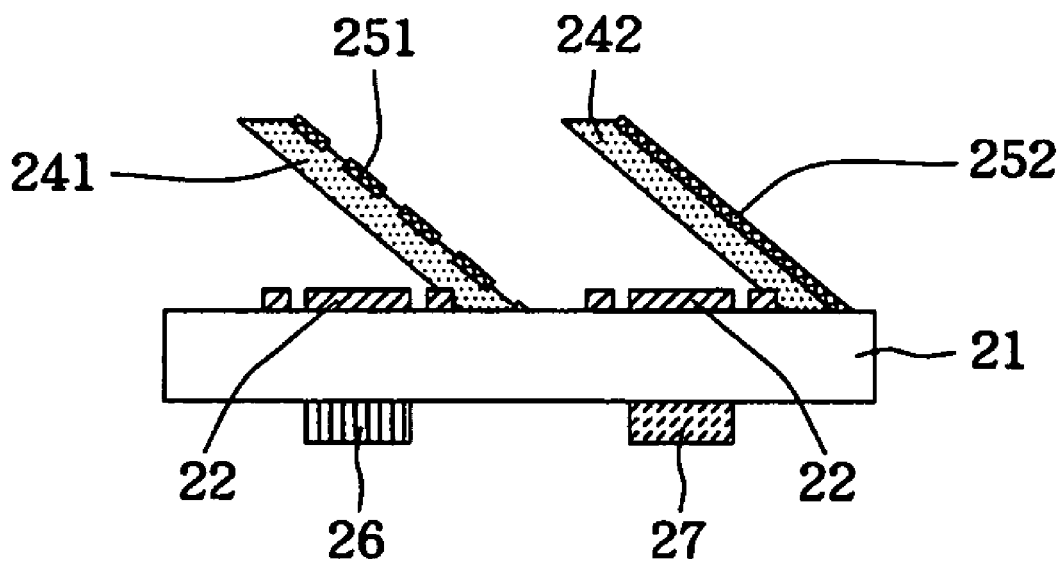

Then, a laser diode 27 and a photo detector 26 are fixed on the lower surface of the transparent substrate 21 by a self-assembly monolayer (SAM) step, as shown in FIG. 2(e). The laser diode 27 is placed under one of the Fresnel lenses 22, and the photo detector 26 is placed under the other. The theorem of the SAM technology is the combination reaction between the bonds of certain metals, e.g., Au, and mercaptan. An Au layer is first formed on the surface of the laser diode 27 and photo detector 26, and a mercaptan substance is coated on the lower surface of the transparent substrate 21. By the powerful bond forces of the Au layer and mercaptan, the laser diode 27 and photo detector 26 can be adhered to adequate locations abundantly and automatically at one time. This technology, a very effectively assembly method, not only can simplify the steps of the assembly, but also can automatically align each optical element with its fixed location.

Figure 3:
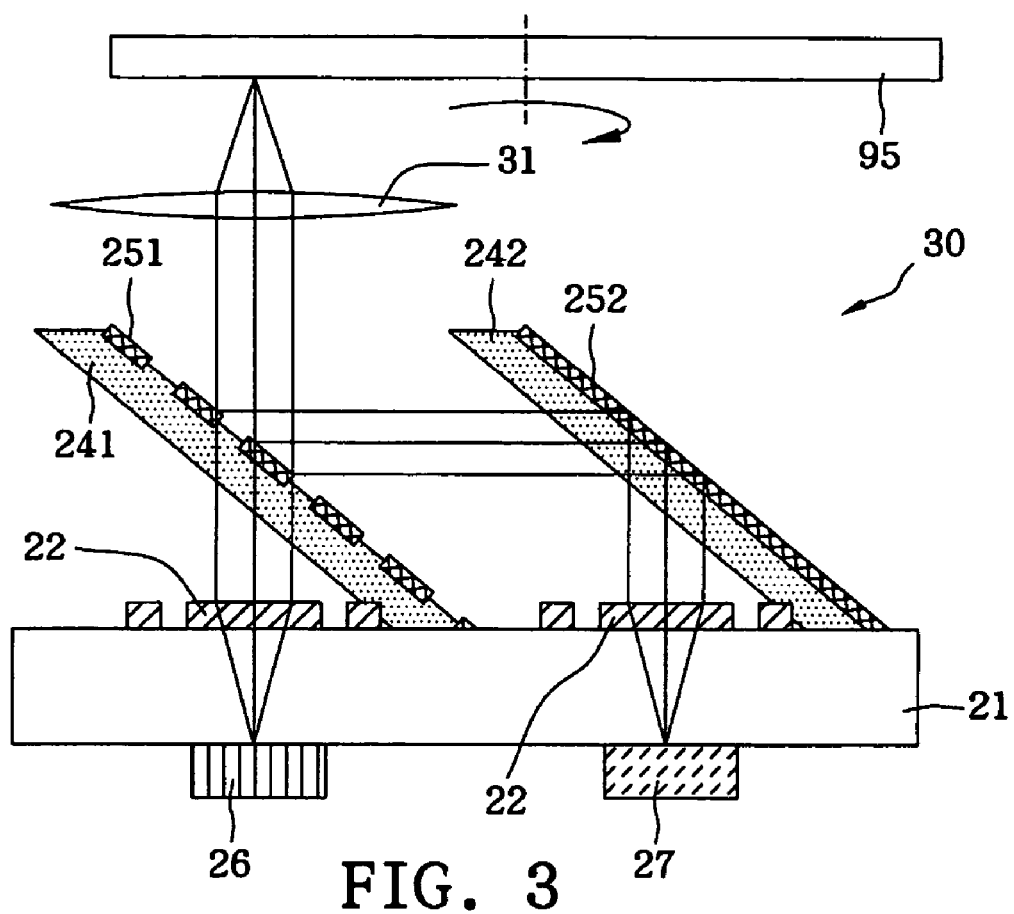
FIG. 3 is a schematic diagram of an optical pickup head module in accordance with the present invention.

At last, an objective lens 31 is formed on the finished combination of FIG. 2(e) to be an optical pick-up head module 30, as shown in FIG. 3. A laser light is emitted from a laser diode 27, and then becomes a collimated beam after passing through the Fresnel lens 22. The collimated beam is reflectively redirected to the first metal layer 251 on the first mirror 241 by the second metal layer 252 on the second mirror 242. Parts of the collimated beam redirected by the first metal layer 251 pass through the objective lens 31 and are focused on the recordable track (not shown) of the an optical disk. Various optical signals respond to the focused beam tracking the pits in the recordable track, and are refracted by the first metal layer 251 to arrive at the first mirror 241. Final, the optical signals are focused on the photo detector 26 by the Fresnel lens 22.

Figure 4:
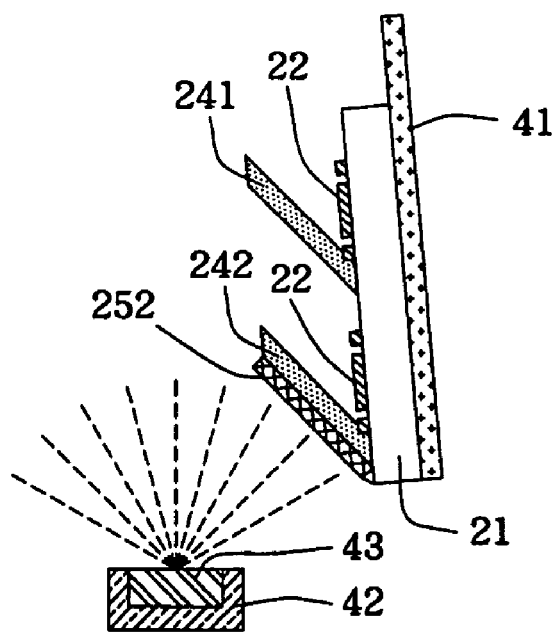
FIG. 4 is a schematic diagram of a deposition step for depositing a metal layer on the outside surface of parallel plates in accordance with the present invention.

FIG. 4 is a schematic diagram of a deposition step for depositing a metal layer on the outside surface of parallel plates in accordance with the present invention. The present invention discloses that the deposition of the first metal layer 251 and second metal layer 252 is completed by a vapor deposition step or a sputtering deposition step. For example, the transparent substrate 21 is placed on a fastening plate 41, and a metal target 43 existing in a container 42 is bombarded by an electron beam. Atoms escaping from the surface of the metal target 43 are deposited on the surface of the second mirror 242. Meanwhile, the Atoms of the metal target 43 cannot be deposited on the first mirror 241 because the first mirror 241 is covered. If we adjust the first mirror 241 and second mirror 242 to a proper angular posture relative to the metal target 43, the Fresnel lens 22 is hidden behind the first mirror 241 and second mirror 242 to avoid the deposition of the metal target 43 thereon. When the vapor deposition or sputtering deposition of the metal target 43 is executing, the surface of the second metal layer 252 is similarly covered with something to avoid the deposition of the second metal layer 252 thereon.

Figure 5A:
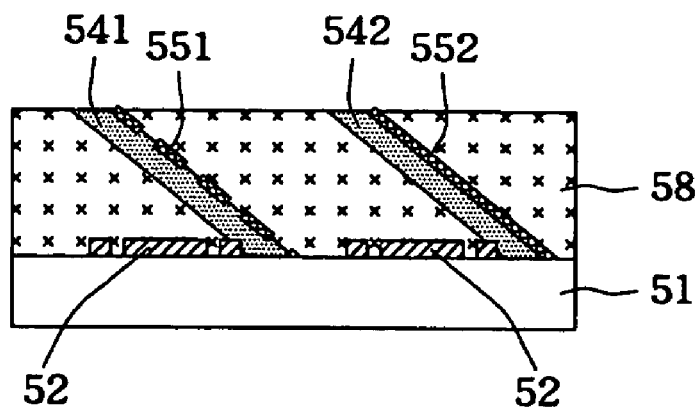
FIGS. 5(a)–5(c) are schematic diagrams of the manufacturing process for a micro optical pickup head module in accordance with another preferred embodiment of the present invention.
Figure 5B:
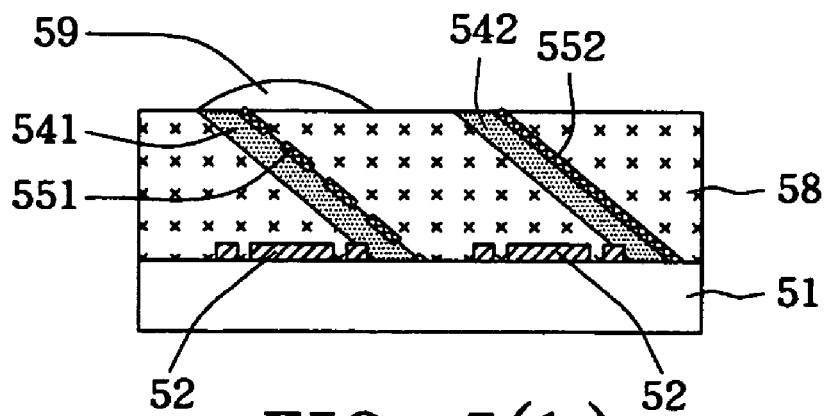
Figure 5C:
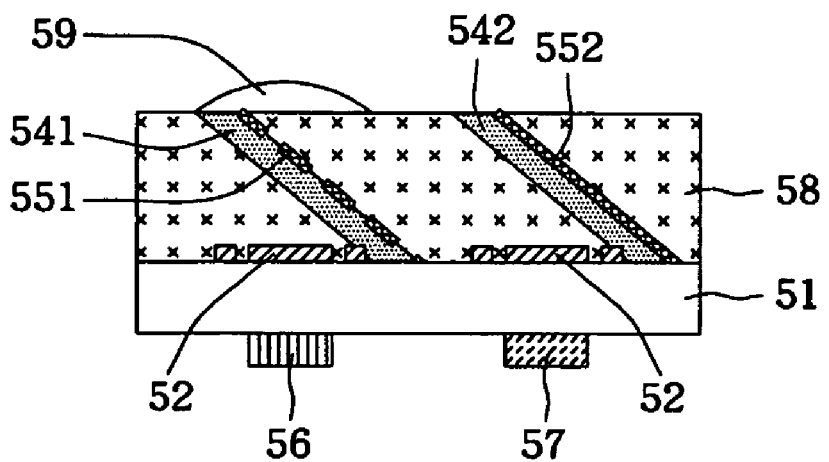

It is another embodiment for the present invention to integrate the steps shown in FIGS. 2(a)–2(d) and 5(a)–5(c), and the steps of FIGS. 5(a)–5(c) succeed the steps of FIGS. 2(a)–2(d). The transparent substrate 51 is covered with a transparent polymeric material 58 till the first mirror 541 and second mirror 542 are immersed in that. The polymeric material 58 is cured by heating or UV light exposure so as to well protect the first metal layer 551, the second metal layer 552 and Fresnel lenses 52.

As shown in FIG. 5(b), a focus objective lens 59 is formed on the upper surface of the polymeric material 58 and over the first mirror 541. Finally, the laser diode 57 and the photo detector 56 are assembled on the lower surface of the objective lens 59, as shown in FIG. 5(c). The photo detector 56 is placed under the objective lens 59. Therefore, light emitted from the laser diode 57 passes through the first mirror 541 and first metal layer 551 and is refracted by the first metal layer 251 to arrive at the first mirror 241 and objective lens 59. Of course, we can mount two laser diodes 57 and two photo detectors 58 on the transparent substrate 51, wherein one set of the laser diode 57 and photo detector 56 is for reading and writing an optical disk with a CD format, and another set is for an optical disk with a DVD format. In addition, a micro actuator (not shown) can be interposed between the objective lens 59 and polymeric material 63. The focal point of the objective lens 59 is variable through the movement of the micro actuator.

Figure 6A:
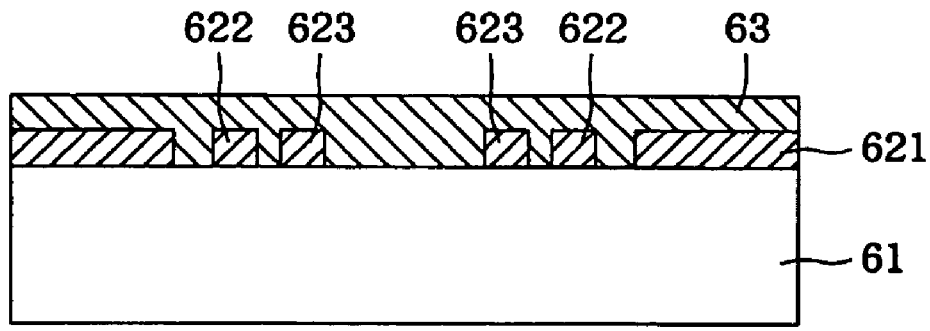
FIGS. 6(a)–6(c) are schematic diagrams of the manufacturing process for an objective lens in accordance with the present invention.
Figure 6B:
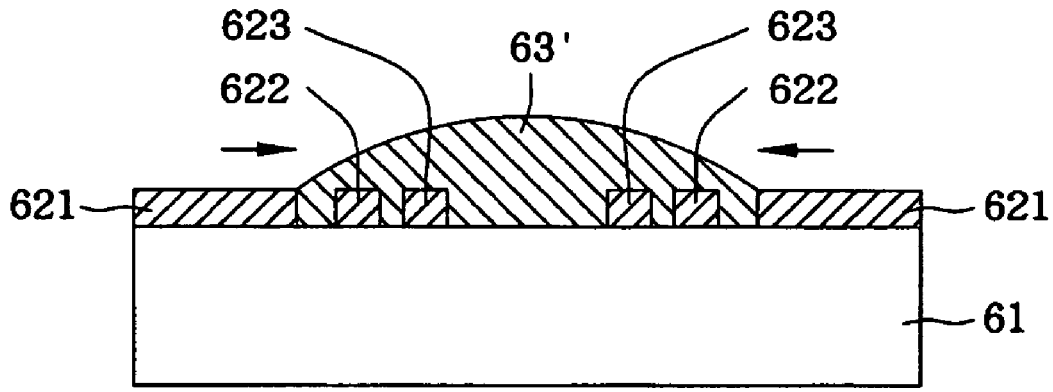
Figure 6C:
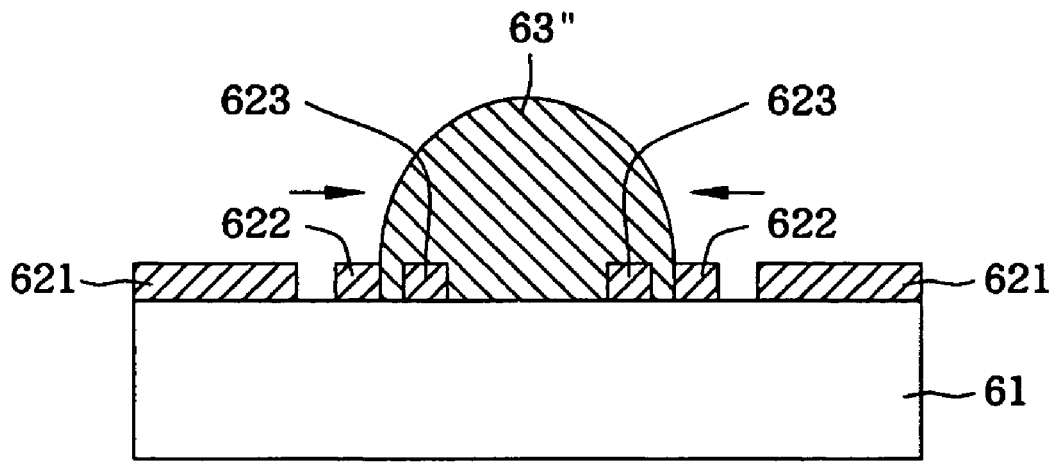

FIGS. 6(a)–6(c) are schematic diagrams of the manufacturing process for an objective lens in accordance with the present invention. First, annular Teflon 621, 622 and 623 are formed on the substrate 61, and then a polymeric material 58 is coated thereon by a spin step. By the hydrophobicity of the Teflon higher than that of the substrate 51, the polymeric material 63 tends toward the center and becomes a hemispherical polymeric material 63' due to the surface tension of cohesion between molecules after the polymeric material 63 is heated. The polymeric material 63 does not remain on the Teflon 621, and is immobilized on the surface of the substrate 61 with a good hydrophilicity instead, as shown in FIG. 6(b). Of course, if we raise the heating temperature for the polymeric material 63, the polymeric material 63 ceaselessly tends toward the center and becomes a hemispherical polymeric material 63'' of a smaller radius, as shown in FIG. 6(c). The present invention discloses that the polymeric material 63 is heated and concentrated within a proper area, and is cured by light exposure so as to become a plano-convex lens as an objective lens.

Figure 7A:
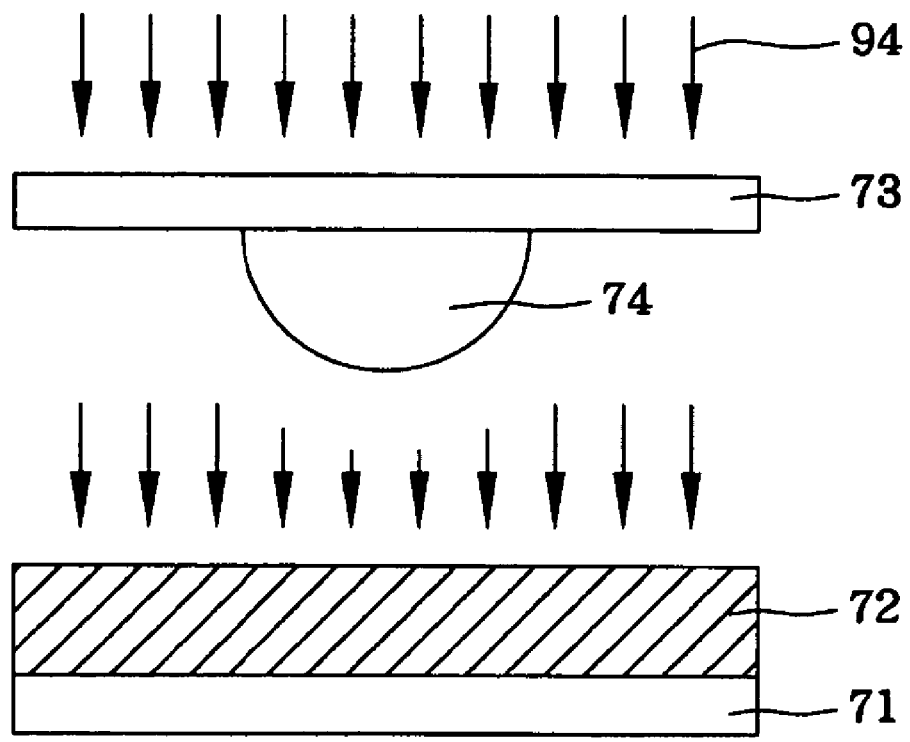
FIGS. 7(a)–7(e) are schematic diagrams of the manufacturing process for an objective lens in accordance with another preferred embodiment of the present invention.
Figure 7B:
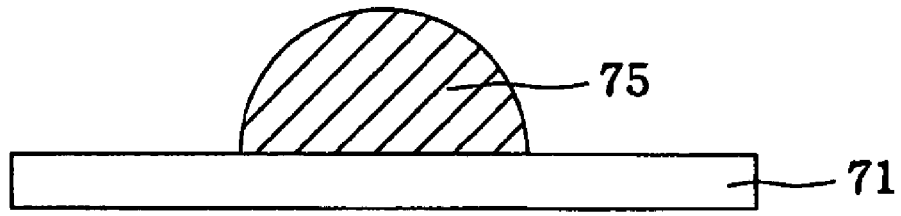
Figure 7C:
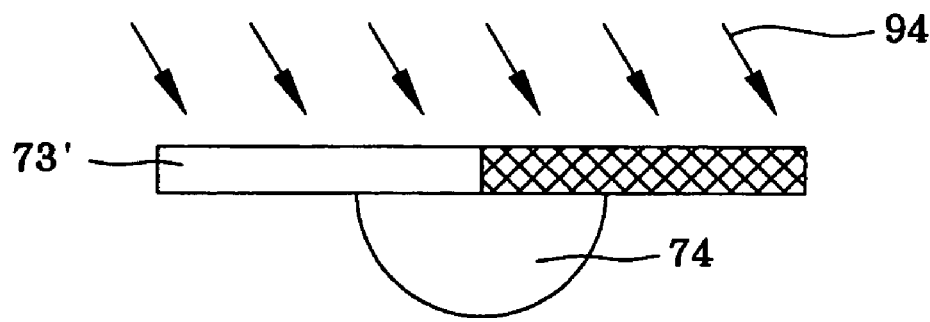
Figure 7D:
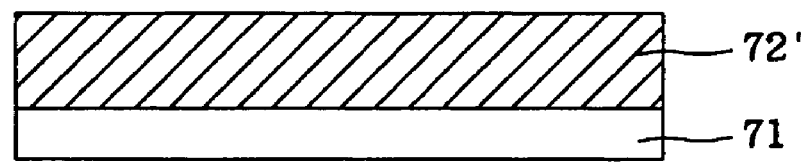
Figure 7E:
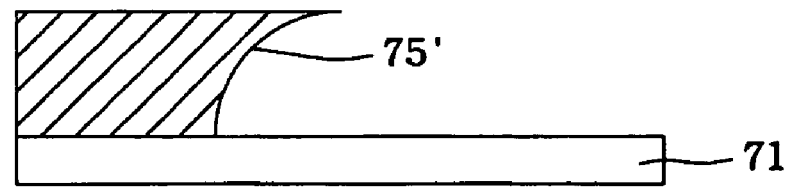

FIGS. 7(a)–7(e) are schematic diagrams of the manufacturing process for an objective lens in accordance with another preferred embodiment of the present invention. First, a translucent hemisphere 74 is formed on a mask 73 made from glass. The transmittance of exposure light is different throughout the various areas of the surface of the hemisphere 74, hence the areas of the photoresist 72 on the substrate 71 have various exposure dosage. A hemispherical plano-convex lens 75 remains after the full exposed areas are removed, because the photoresist 72 is a positive photoresist. Of course, if we change the incident angle between the exposure light 94 and a mask 73' from vertical to inclined, and cover all the patterns located on the right half of the mask 73' relative to the hemisphere 74. A negative photoresist 72' on the substrate 71 is turned into an asymmetric curved lens 75' after being exposed to light, as shown in FIGS. 7(c)–7(d). If the photoresist 72' is coated on the lower surface of the substrate 71, the exposure light 94 is refracted from the substrate 71 to the photoresist 72'. A flat plan-concave lens 75'' remains after the incomplete exposed areas is removed, as shown in FIG. 7(e).

The above-described embodiments of the present invention are intended to be illustrative only. Numerous alternative embodiments may be devised by persons skilled in the art without departing from the scope of the following claims.

What is claimed is:

1. A micro optical pickup head module, comprising:
a transparent substrate having a first surface and a second surface;
at least two Fresnel lenses formed on the first surface of the transparent substrate;
a first mirror placed on the first surface of the transparent substrate in an acute included angle between each other and being over one of the Fresnel lenses;
a first metal layer formed on the surface of the first mirror opposite to the acute included angle for half refracting light and half reflecting light;
a second mirror placed on the first surface of the transparent substrate in an acute included angle between each other and being over the other one of the Fresnel lenses;
a second metal layer formed on the surface of the second mirror opposite to the acute included angle and for reflecting light;
a laser diode placed on the second surface of the transparent substrate and opposite to the second mirror; and
a photo detector placed on the second surface of the transparent substrate and opposite to the first mirror.

2. The micro optical pickup head module of claim 1, further comprising an objective lens placed over the first metal layer.

3. The micro optical pickup head module of claim 1, further comprising:
a polymeric material overlaid on the first mirror and second mirror; and
an objective lens placed on the surface of the polymeric material and opposite to the photo detector.

4. The micro optical pickup head module of claim 1, further comprising an anti-reflecting layer formed on the first surface of the substrate.

5. The micro optical pickup head module of claim 1, wherein the Fresnel lenses acts as a collimation lens and a focusing lens.

6. The micro optical pickup head module of claim 2, further comprising a micro actuator in cooperation with the objective lens adjusting a focal point of the objective lens.

7. A method of manufacturing micro optical pickup head module, comprising the steps of:
- providing a transparent substrate;
- forming a set of Fresnel lenses on the transparent substrate;
- coating a thick film photoresist layer on the transparent substrate and the Fresnel lenses;
- placing a mask over the thick film photoresist layer and processing an inclined exposure;
- striping the thick film photoresist layer to form a first mirror and a second mirror at an angle on the transparent substrate;
- depositing a first metal layer on the surface of the first mirror for half refracting light and half reflecting light; and
- depositing a second metal layer on the surface of the second mirror for reflecting light.

8. The method of manufacturing micro optical pickup head module of claim 7, further comprising a step of placing a laser diode and a photo detector on the surface of the transparent substrate opposite to the Fresnel lenses.

9. The method of manufacturing micro optical pickup head module of claim 8, further comprising a step of combining the laser diode and photo detector with the transparent substrate by a self-assembly monolayer step which employs powerful bond forces between a metal layer and mercaptan to form a combination.

10. The method of manufacturing micro optical pickup head module of claim 7, further comprising a step of coating an anti-reflecting layer on the transparent substrate.

11. The method of manufacturing micro optical pickup head module of claim 7, further comprising a step of immersing the mask and thick film photoresist layer in a liquid with a refraction index near to the refraction index of the thick film photoresist layer.

12. The method of manufacturing micro optical pickup head module of claim 11, wherein the liquid has a refraction index in a range of 1.4 to 1.8.

13. The method of manufacturing micro optical pickup head module of claim 11, wherein the liquid is comprised of glycerol.

14. The method of manufacturing micro optical pickup head module of claim 7, wherein the included angle between the transparent substrate and one of the first mirror and the second mirror is in a range of 19 to 90 degrees.

15. The method of manufacturing micro optical pickup head module of claim 7, further comprising a step of eliminating specific light by a polarized mirror.

16. The method of manufacturing micro optical pickup head module of claim 7, further comprising the steps of:
- overlaying the first mirror and the second mirror with a transparent polymeric material;
- forming an objective lens on the surface of the polymeric material; and
- placing a laser diode and a photo detector on the surface of the transparent lens opposite to the polymeric material.

17. The method of manufacturing micro optical pickup head module of claim 16, further comprising a step of filling pinholes of the surface of the thick film photoresist with an oil film.

* * * * *